INVENTOR.
GOTTFRIED MEHNERT
BY
his ATTORNEY

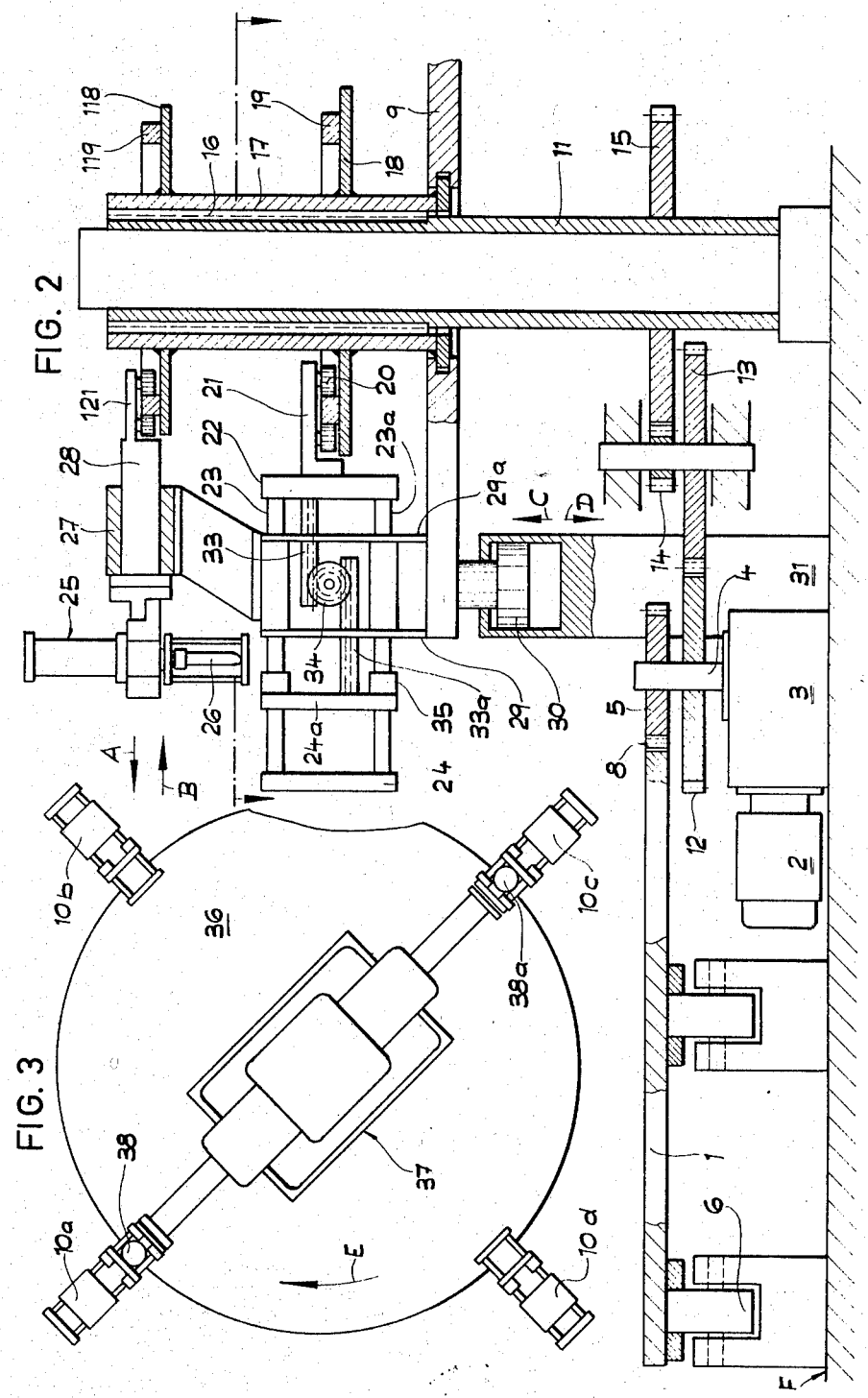

Jan. 19, 1971   G. MEHNERT   3,555,598
APPARATUS FOR BLOW MOLDING OF PLASTIC ARTICLES
Filed Jan. 17, 1968   4 Sheets-Sheet 3

INVENTOR.
GOTTFRIED MEHNERT
BY Michael J. Striker
his ATTORNEY

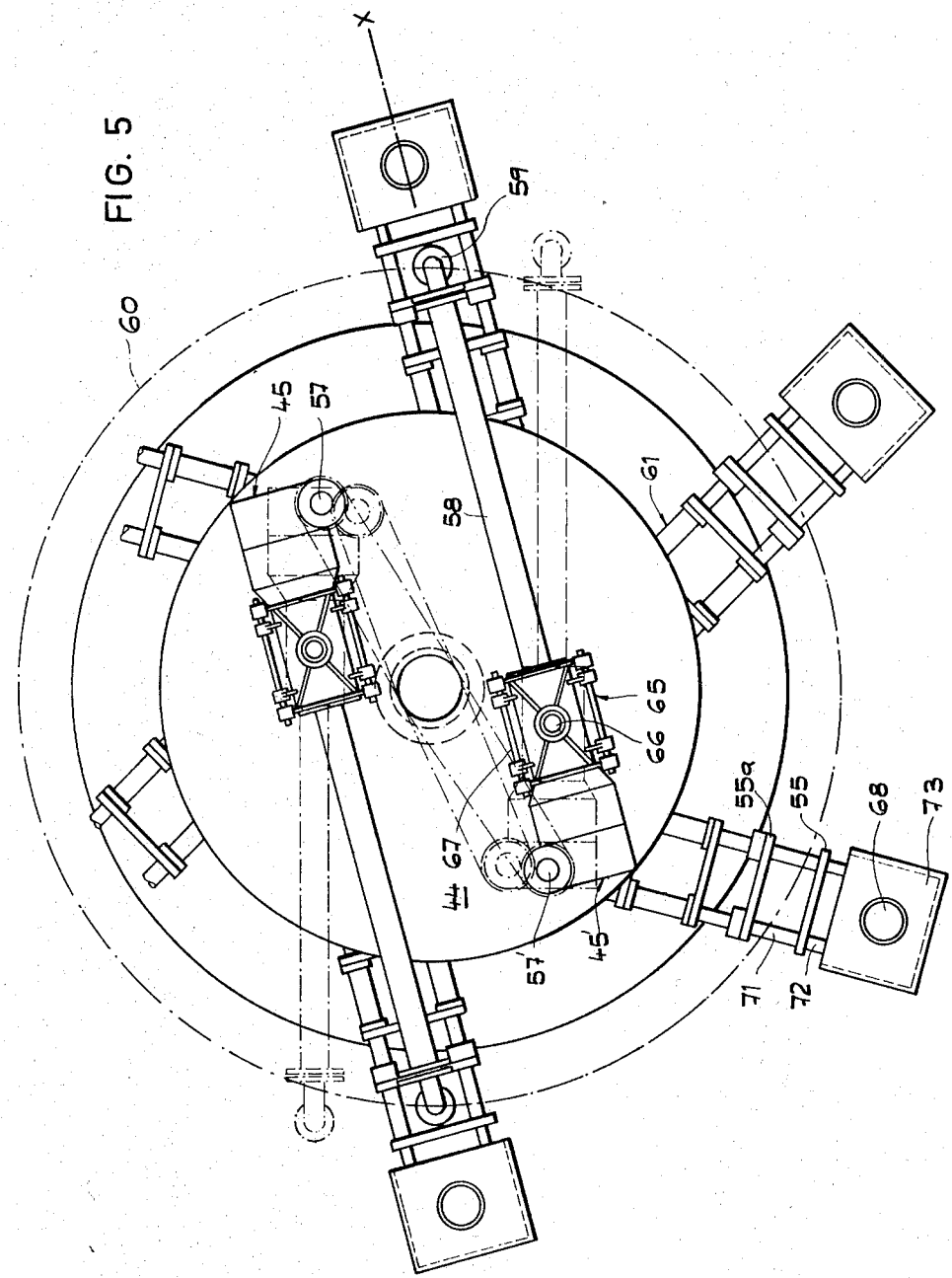

United States Patent Office 3,555,598
Patented Jan. 19, 1971

3,555,598
APPARATUS FOR BLOW MOLDING OF PLASTIC ARTICLES
Gottfried Mehnert, Berlin-Mariendorf, Germany, assignor to Conduco A.G., Zug, Switzerland
Filed Jan. 17, 1968, Ser. No. 698,523
Claims priority, application Germany, Jan. 28, 1967, M 72,576
Int. Cl. B29d 23/03
U.S. Cl. 18—5                        16 Claims

ABSTRACT OF THE DISCLOSURE

A blow molding apparatus wherein one or more extrusion nozzles travel along a circular path about a vertical axis and supply parisons to open-and-shut blow molds in a series of mold units installed adjacent to the circular path and cooperating with blowing and calibrating units to convert parisons into bottles or analogous hollow plastic articles. The drive which moves the nozzle or nozzles also transmits motion to parts of the mold units and blowing units so that the operation of such units is synchronized with movements of the nozzles which travel continuously and extrude continuous tubular or otherwise configurated blanks of plasticized material. Requisite lengths are severed from such blanks to form parisons which are received between the mold sections in the mold units and are converted into hollow articles in response to injection of compressed gas or in response to evacuation of air from the cavities which receive the parisons.

BACKGROUND OF THE INVENTION

The present invention relates to blow molding of plastic articles in general, and more particularly to improvements in apparatus for blow molding of bottles, vials, tubes, cans and/or other hollow articles from plasticized material.

Known blow molding apparatus comprise one or more open-and-shut molds defining one or more cavities which receive tubular or strip-shaped parisons from one or more nozzles of a stationary extruder and wherein such parisons are converted into hollow articles, either by injection of air or another gas into the interior of parisons by means of blowing mandrels or by evacuation of air from the spaces surrounding the parisons in the molds. In the latter instance, the blow mold is provided with a needle which draws air from the mold cavity around a parison so that the latter expands due to a pressure differential between its interior and the surrounding area. As a rule, a conventional blow molding apparatus comprises three main components, namely, a stationary extruder provided with one or more nozzles and with means for receiving granular starting material which is converted into a plasticized mass and is extuded through the nozzle to form a preferably tubular parison, one or more open-and-shut molds comprising two or more sections movable with reference to each other to receive parisons from the extruder, and a blowing or expanding unit which causes the parisons to expand and to follow the outline of the cavity in the mold in response to injection of compressed blowing medium or in response to evacuation of air from the cavity. Since the apparatus which utilize blowing mandrels are presently in greater demand than those which utilize needles serving to evacuate air from the mold cavity, the following description of my invention will deal with the first class of blow molding apparatus with the understanding however, that the invention can be embodied with equal advanage in apparaus which utilize one or more needles. As a rule, the mandrel of the blowing unit also serves to calibrate one end of a hollow plastic article, for example, the neck of a bottle or a like container.

Each blow molding apparatus is further provided with a fully automatic or semiautomatic control system which synchronizes the movements of various parts to increase the output and to insure the formation of satisfactory hollow articles. Such control system regulates the movements of mold sections with reference to each other, severing of parisons of requisite length, movements of the blowing mandrel, the rate of extrusion of plasticised material through the nozzle or nozzles of the extruder, and the movements of certain other parts. It is much simpler to control movements of parts in the extruder than to control movements of parts in the mold and in the blowing unit. Thus, the extruder normally comprises a heating unit which heats the granular material and a rotary screw which feeds plasticized material to the extrusion nozzle. Therefore, a single electrical connection suffices to effect heating of material in and the the evacuation of material from the extruder. On the other hand, movements of the blowing mandrel and of mold sections often necessitate the provision of quite complicated electrohydraulic and/or electropneumatic systems which include a host of sealing devices, means for synchronizing movements of mold sections with reference to the blowing mandrel and vice versa, and means for regulating the admission of a blowing medium through the mandrel.

The problems in connection with proper control of various movements are not overly serious when the apparatus comprises a single mold whose sections perform simple reciprocatory movements and wherein a single blowing mandrel moves along a straight path. However, many recent types of blow molding apparatus comprise a large number of molds which travel past a stationary extruder, normally along an endless path, and a requisite number of blowing mandrels. As a rule, the molds are mounted on a revolving turntable and the electrohydraulic or electropneumatic control system or systems which regulate the movements of molds and of mold sections are quite complicated and prone to malfunction. The conduits for hydraulic or pneumatic fluid are installed in a centrally located shaft and deliver fluid to distributors which supply fluid to individual molds and blowing units. Difficulties arise particularly in connection with proper sealing of passages for fluid and also in connection with proper timing of various movements. A single extruder normally supplies plasticized blanks to a large number of molds and this creates additional problems because, if the molds are transported at a high speed, the extruder must furnish blanks at frequent intervals. The rate at which an extruder delivers blanks cannot be increased at will, especially in the processing of certain types of thermoplastic materials, for example, those on the polyvinyl chloride basis. Such materials must be heated within an accurately determined range and must be treated at a very narrow range of pressures which reduces the output of the extruder.

SUMMARY OF THE INVENTION

It is an object of my invention to provide an apparatus for producing hollow plastic articles by blow molding wherein a wide variety of hollow articles can be produced at a higher rate than heretofore.

Another object of the invention is to provide an automatic blow molding apparatus whose control system is simpler, less expensive and less prone to malfunction than the control systems of conventional apparatus.

A further object of the invention is to provide an apparatus wherein the controls for the molds and blowing units are simpler than in conventional apparatus and wherein the operation of moving parts of the molds and blowing units it synchronized with operation of one or more extruders in a novel material- and space-saving way.

An additional object of the invention is to provide a novel mode of mounting and operating the extruder or extruders, mold units and blowing and calibrating units of a blow molding apparatus.

Still another object of the invention is to provide an apparatus wherein the molds can be placed close to each other and wherein the molds need not travel past one or more extrusion nozzles.

A concomitant object of the invention is to provide a blow molding apparatus which can be rapidly converted for the production of differently dimensioned and/or configurated hollow articles.

An ancillary object of the invention is to provide a novel drive for the moving parts of a blow molding apparatus.

The apparatus of my invention comprises means for moving the nozzle or nozzles of one or more extruders along an endless path, preferably along a circular path, and means for placing two or more preferably equidistant mold units and associated blowing units adjacent to the path so that the nozzle or nozzles register with and supply tubular parisons or other suitable blanks to successive mold units during travel along the endless path.

The extruder or extruders may be mounted on a turntable for movement of their nozzle or nozzles along an endless path which surrounds the area accommodating the mold units, or the mold units maybe outwardly adjacent to such path.

The novel features which are considered as characteristic of the invention are set forth in particular in the appended claims. The improved blow molding apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is an enlarged fragmentary vertical sectional view as seen in the direction of arrows from the line II—II of FIG. 1;

FIG. 3 is a fragmentary top plan view of a second blow molding apparatus wherein the support surrounds the turntable;

FIG. 5 is a top plan view of the apparatus shown in FIG. 4, further showing a slightly different way of mounting the extruders on the turntable;

DESCRIPTION OF THE PREFERRED EMBODIMENTS

Figure 1:
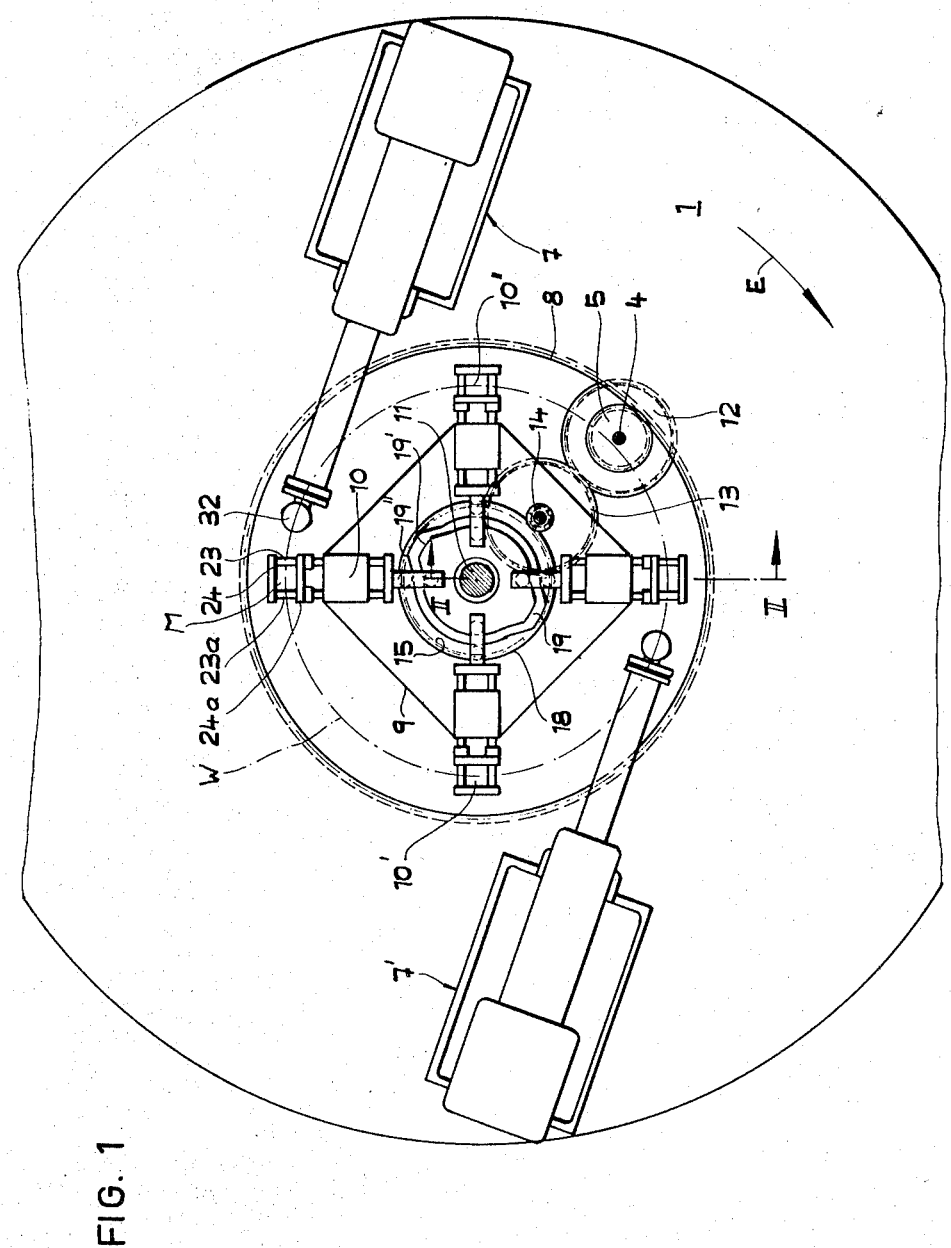
FIG. 1 is a fragmentary top plan view of a blow molding apparatus which embodies one form of my invention and wherein the turntable for the extruders surrounds the support for the mold units.

Referring first to FIGS. 1 and 2, there is shown a blow molding apparatus which comprises a drive including an annular turntable 1 located in a horizontal plane at a level slightly above a stationary frame F. The drive further includes a variable-speed transmission 3 mounted on the frame F and receiving motion from an electric motor 2. The vertical output shaft 4 of the transmission 3 carries a gear 5 which meshes with an internal gear 8 of the turntable 1. The gears 5, 8 form a speed reducing unit and the turntable 1 rotates on guide rolls 6 mounted in brackets which form part of the frame F. In the embodiment of FIGS. 1 and 2, the motor 2 and transmission 3 cause the turntable 1 to rotate continuously about a vertical axis and preferably at a constant speed. The turntable 1 supports two extruders 7, 7' shown in FIG. 1. The phantom-line circle W indicates the endless circular path along which the extrusion nozzles 32 of the extruders 7, 7' move when the turntable 1 rotates. The direction of rotation of the turntable 1 is indicated by arrow E.

The space within the internal gear 8 of the turntable 1 accommodates a raised horizontal table or support 9 which may but need not be of polygonal outline. FIG. 1 shows that the table 9 is of square outline but it is equally possible to employ a round, oval or otherwise configurated table. This table supports four equidistant mold units 10 which are adjacent to the path W of the nozzles 32. Thus, each of the two nozzles 32 can supply tubular parisons or otherwise configurated blanks of plasticized material to successive mold units 10 when the turntable 1 is driven by the parts 2–5 and 8 to rotate in the direction indicated by arrow E. A centrally located vertical hollow main shaft 11 is coaxial with the turntable 1 and is driven in synchronism with the turntable by a gear train including a first gear 12 on the output shaft 4 of the transmission 3, a meshing second gear 13 mounted on an intermediate shaft, a third gear 14 on the intermediate shaft, and a fourth gear 15 on the shaft 11. The gears 14, 15 constitute a gear reducing unit. The main shaft 11 rotates a vertically reciprocable control sleeve or cylinder 17 by way of one or more keys 16 which permit the sleeve to move up and down. The sleeve 17 carries vertically spaced disk-shaped platform or carriers two of which are shown in FIG. 2 at 18 and 118. The platforms are preferably welded to the sleeve 17 and they respectively carry ring-shaped control cams or actuating cams 19, 119 which respectively serve to actuate the moving parts of the mold units 10 and the moving parts of associated blowing and calibrating units 25. Each mold unit 10 comprises a radially movable follower arm 21 provided with two rollers 20 which track the inner and outer faces of the cam 19 on the platform 18. Each arm 21 is affixed to a crosshead 22 of the respective mold unit 10 and the crosshead 22 initiates movements of reciprocable holders 24, 24a each of which carries one section of an open-and-shut blow mold M. The means for transmitting motion from the crossheads 22 to the respective holders 24, 24a includes tie rods 23, 23a. The directions in which the holders 24, 24a are movable to open or close the corresponding molds M are indicated by arrows A and B. The manner in which the sections of the mold M are bolted or otherwise detachably and/or adjustably affixed to the holders 24, 24a is known from the art of blow molding apparatus and need not be described here.

Since the output shaft 4 drives not only the turntable 1 (by way of gears 5 and 8) but also the main shaft 11, sleeve 17 and cams 19, 119 (by way of gears 12 to 15), the movements of parts in the mold units 10 and blowing and calibrating units 25 are accurately synchronized with movements of nozzles 32 along the endless path W. The mechanical synchronizing assembly including the gears 12–15 and parts 11, 16, 17, 18, 118 is very simple, rugged and inexpensive; its function is to coordinate closing and opening movements of the holders 24, 24a in the mold units 10 with movements of the blowing units 25 and their blowing and calibrating mandrels 26 and with movements of the nozzles 32 along the path W. The directions in which the blowing units 25 are movable radially of the main shaft 25 by cam 119 are indicated by arrows A and B. The mandrels 26 are further movable up and down so that they may penetrate into the upper ends of parisons held by the mold sections on the associated holders 24, 24a. The blowing units 25 are reciprocable radially of the main shaft 11 in order not to interfere with movements of nozzles 32 along the path W, i.e., each mandrel 26 is moved into registry with the corresponding mold M when an extruder has bypassed the mold and when the mold is held in closed position by its holders 24 and 24a. The casings of the blowing units 25 are provided with pistons 28 which are slidable in horizontal ways 27 carried by the table 9 and each piston 28 is connected with a follower arm 121 whose rollers track the faces of the upper control cam 119 on the platform 118 of the sleeve 17. Each blowing unit 25 further comprises a vertical cylinder which moves the corresponding mandrel 26 up and down.

In accordance with a further feature of my blow molding apparatus, the entire table 9 with sleeve 17, platforms 18, 118, mold units 10 and blowing units 25 is movable up and down by a lifting or reciprocating assembly which comprises two or more fluid-operated cylinder and piston units including double-acting hydraulic or pneumatic cylinders 31 mounted on the frame F and pistons or plungers 30 reciprocable in the corresponding cylinders 31 and affixed to the underside of the table 9. The table 9 carries brackets 29, 29a for the mold units 10. The directions in which the table 9 can reciprocate up and down are indicated by arrows C and D. The purpose of the reciprocating means including the cylinders 31 and pistons 30 is to lower closed molds M away from the path of movement of nozzles 32 upon receipt of parisons from such nozzles. This insures that the nozzles 32 can extrude parisons continuously and that the lower end of a fresh parison does not slide along the top of a closed mold M when the latter closes upon receipt of the preceding parison. Of course, the arrangement may be such that the table 9 remains stationary and that the mold units 10 need not move up and down. In such apparatus, the control sleeve 17 can be omitted and the platforms 18, 118 for the cams 19, 119 can be affixed directly to the main shaft 11.

The planes in which the sections of the molds M abut against each other when the molds are closed are tangential to the path W.

As shown in FIG. 1, the nozzle 32 of the extruder 7 has already advanced beyond the mold M of the mold unit 10. The parison which is already accommodated in the cavity of the mold M was extruded during travel of the nozzle 32 from the mold unit 10' toward the mold unit 10. During extrusion, the axis of the nozzle 32 was caused to move along the path W from the nine o'clock position to the twelve o'clock position, as viewed in FIG. 1. The sections of the mold M were moved apart by the corresponding holders 24, 24a shortly before the nozzle 32 arrived to the twelve o'clock position, and such opening of the mold M in the unit 10 was caused by a suitably configurated portion 19' of the cam 19 which rotates with the main shaft 11. During such opening, the freshly formed blow molded article (e.g., a plastic bottle) was ejected or discharged from the cavity of the mold M prior to entry of the parison issuing from the nozzle 32 during travel from the unit 10' toward the unit 10. FIG. 1 illustrates the mold M of the unit 10 in closed position, i.e., this mold accommodates a fresh parison which is in the process of being converted into a hollow article by being expanded by air or another gas admitted by the mandrel 26 of the associated blowing and calibrating unit 25. The manner in which the mold M is caused to open has been described in connection with FIG. 2, i.e., the rollers 20 on the corresponding follower arm 21 track the portion 19' of the cam 19 and the arm 21 shifts the crosshead 22. The latter moves the tie rods 23, 23a and holder 24 with one section of the mold M radially outwardly (arrow A). The other section of the mold M is then moved radially inwardly (arrow B) by the holder 24a which receives motion from the crosshead 22 by way of a rack 33, a pinion 34 and a rack 33a. Immediately after a fresh parison enters the space between the sections of the open mold M, i.e., when the rollers 20 on the respective follower arm 21 reach the edge 19" of the cam 19, the arm 21 causes the crosshead 22 to move radially inwardly and to move the holders 24, 24a toward each other in order to close the mold M. The mold then remains closed while the corresponding follower arm 121 moves the associated mandrel 26 into registry with the upper end of the entrapped parison and while the mandrel 26 moves downwardly to admit air and to calibrate the upper end portion of the resulting hollow plastic article. Also, the mandrel 26 is withdrawn upwardly and the blowing unit 25 is withdrawn radially inwardly before the mold M opens again in order to receive a parison from the nozzle of the extruder 7'. This takes place when the parison issuing from the nozzle 32 of the extruder 7 enters the space between the sections of the opened mold in the mold unit 10". The same cycle is repeated again and again as long as the motor 2 drives the turntable 1 and the main shaft 11.

In order to insure unimpeded entry of fresh parisons into the spaces between the sections of opened molds M, the upper tie rods 23 are located behind the corresponding lower tie rods 23a, as viewed in the direction of the arrow E. This is shown for the mold unit 10 of FIG. 1. The inner holders 24a are provided with bearing sleeves 35 which slide along the respective tie rods 23 and 23a.

Since the extruders 7 and 7' travel continuously about the axis of the main shaft 11, and since their nozzles 32 discharge parisons without interruptions, the lower end of a fresh parison could slide along the top face of a closed mold M during travel of a nozzle from the three-, six-, nine- or twelve o'clock position, as viewed in FIG. 1. Such contact is prevented by cylinders 31 ad pistons 30 which move the table 9 downwardly (arrow D) as soon as two of the molds M receive parisons from the adjacent nozzles 32.

It will be seen that the mode of operating my improved blow molding apparatus is different from the mode of operation of aforedescribed conventional apparatus. Thus, and while a conventional apparatus with several mold units utilizes a stationary extruder, I employ one or more travelling extruders or travelling extrusion nozzles and several mold units and blowing units which might have to perform certain simple movements but need not rotate or otherwise advance past the extruder or extruders. The means for connecting the extruders 7, 7' to a suitable source of electrical energy occupies much less room and is less expensive than a system of conduits, distributors and valves which is needed to supply hydraulic and/or pneumatic fluids to several travelling mold units and blowing units. For example, the extruders can receive current from a live rail which is mounted adjacent to the turntable 1; such current is used to heat the plastic material and to drive the motor or motors which rotate the feed screw or screws in the extruders.

The turntable 1 could rotate intermittently; however, at this time I prefer to employ a continuously driven turntable to avoid swinging of freshly extruded parisons or blanks during intermittent movements of extruders and while the extruders come to a halt to permit severing of parisons. Thus, and if the extruders are caused to rotate with the turntable 1 at a constant speed, each nozzle 32 discharges a vertical parison which does not sway back and forth and can be properly introduced into the space between the sections of open molds M.

FIG. 3 illustrates schematically a portion of a second blow molding apparatus wherein a dsik-shaped turntable 36 carries a twin extruder 37 having two extrusion nozzles 38, 38a moving along an endless circular path in the direction indicated by arrow E and past four equidistant mold units 10a, 10b, 10c, 10d which are outwardly adjacent to such path. An advantage of the apparatus shown in FIG. 3 is that the mold units 10a–10d and the associated blowing and calibrating units (not shown) are more readily accessible than in the apparatus of FIGS. 1 and 2.

Figure 4:
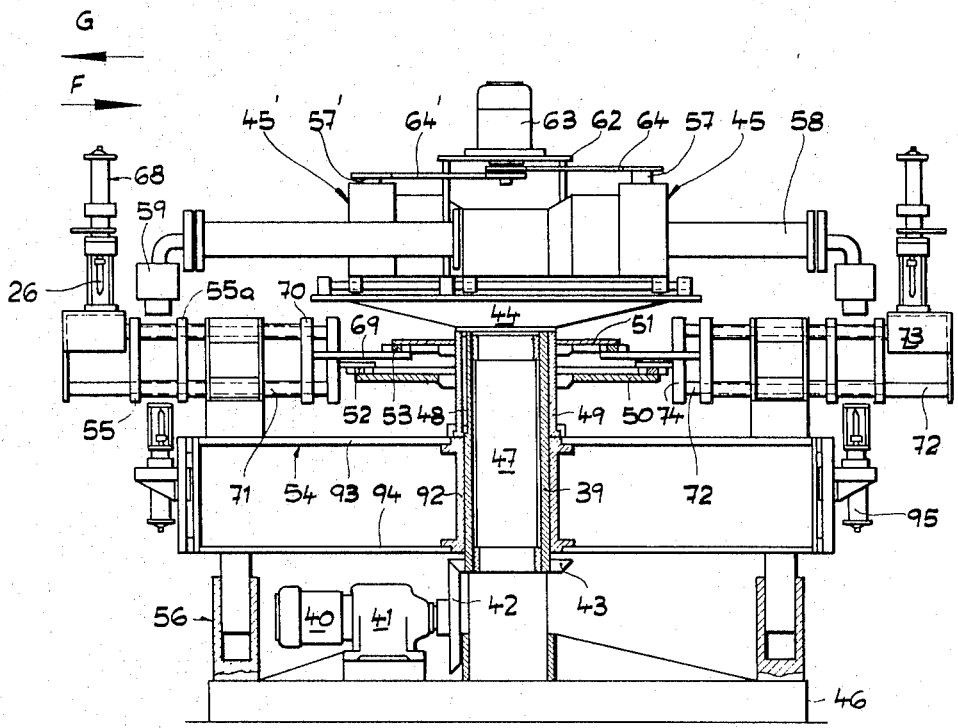
FIG. 4 is a central vertical sectional view of a third blow molding apparatus which is similar to the apparatus of FIG. 3.

FIGS. 4 and 5 show in greater detail a blow molding apparatus which is analogous to the apparatus of FIG. 3 because the extruders are located closer to a centrally located main shaft 39 than the mold units. The main shaft 39 is rotated continuously by a drive including an electric motor 40, a variable-speed transmission 41 and bevel gears 42, 43. The upper end portion of the main shaft 39 is rigid or integral with a turntable 44 which carries two extruders 45, 45'. The shaft 39 rotates about a stationary column 47 which is affixed to and extends upwardly from a base portion 46 of the frame. The upper portion of this shaft 39 rotates a control sleeve or cylinder 49 by way of one or more axially parallel keys 48. The sleeve 49 is movable up and down and is rigid with two disk-shaped carriers or platforms 50, 51 for control cams 52, 53. Another function of the main shaft 39 is to center a vertically reciprocable table or support 54 for the mold units 61. This table 54 is movable up and down by two or more reciprocating means 56 each of which includes a fluid-operated cylinder and piston assembly, see FIG. 4. The holders for the sections of molds in the mold units 61 are shown at 55 and 55a. When the table 54 moves downwardly, it entrains the control sleeve 49 and the cams 52, 53 so that these cams remain in continuous engagement with the follower arms of the mold units and blowing units. The reciprocating means 56 carry the weight of the table 54 and of the parts mounted thereon and the fluid flow regulating system for the means 56 serves to control the speed of downward movement of the table when the mold units should be moved away from the path of the nozzles 59 of the extruders 45, 45' on the turntable 44.

FIG. 5 shows that each of the extruders 45, 45' is arranged to swivel or pivot with reference to the turntable 44. The pivots 57, 57' for these extruders are vertical and are eccentric with reference to the axis of the turntable 44. Furthermore, the elongated cylinders 58 of the extruders 45, 45' are shiftable lengthwise, i.e., at right angles to the axes of the pivots 57, 57' and main shaft 39. Such mounting of the extruders 45, 45' renders it possible to change the diameter of the endless circular path 60 for the nozzles 59. The arrangement may be such that the entire extruder 45 or 45' is movable radially of the respective pivots 57 or 57', or that the corresponding cylinder 58 moves lengthwise relative to the remainder of the respective extruder. Changes in the diameter of the path 60 are desirable for several reasons, i.e., to compensate for inaccuracies in machining or mounting of the parts, to convert the apparatus for the production of different types of hollow plastic articles which require differently dimensioned and/or configurated molds, and/or to change the angular distance between the nozzles 59. Such distance might require adjustment if the number of mold units 61 is changed from six (see FIG. 5) to more or less than six.

A bracket 62 of the turntable 54 supports an electric motor 63 which drives the extruders 45, 45' by way of belt or chain transmissions 64, 64'. The axes of input shafts of the extruders 45, 45' can coincide with the axes of the respective pivots 57, 57' (see FIG. 4). FIG. 5 shows a modified construction and mounting of extruders 45, 45'. Each of these extruders is suspended in and is movable with reference to a slide or carriage 65 which can swivel on a pivot 66 mounted on the turntable 54. The pivots 66 are hollow and are located above the hoppers or magazines of the respective extruders so that they can feed granular or other starting material which is plasticized in the extruders to be converted into tubular or otherwise configurated blanks. Each carriage 65 has lateral guide rods 67 on which the respective extruder 45, 45' can move lengthwise to move its nozzle 59 nearer to or away from the main shaft 39. The transmission of torque from motor 63 to the pivots 57, 57' which are rigid with the respective extruders 45, 45' and can swing about the corresponding pivots 66 can be readily regulated by providing the transmissions 64, 64' with suitable tensioning rollers or sprockets to insure that the chains or belts of these transmissions remain taut in all positions of the pivots 57, 57' with reference to the output shaft of the motor 63.

FIG. 5 shows further that the axes X of the six mold units 61 need not extend radially of the main shaft 39, i.e., that they need not intersect the axis of the main shaft. Otherwise stated, the axes X bypass the center of the path 60. This renders it possible to reduce the diameter of the path 60 and to thus reduce the space requirements of the blow molding apparatus.

Another difference between the apparatus of FIGS. 1–2 and 4–5 is that the latter apparatus employs a different and more compact control system which effects closing and opening of mold units 61 and movements of associated blowing and calibrating units 68. Such control system includes the aforementioned control cams 52, 53 on the platforms 50, 51 of the control sleeve 49. During entry of parisons into the spaces between the sections of two open molds, the corresponding holders 55, 55a of the mold units 61 and the blowing units 68 assume the positions shown in FIG. 4. This illustration shows that the holders 55, 55a are moved apart and that the two nozzles 59 are located midway between and above the respective pairs of holders as well as that the corresponding blowing units 68 are shifted radially outwardly (arrow G) so as not to interfere with movements of the nozzles. The units 68 are thereupon moved inwardly (arrow F) and into registry with the parisons in closed molds and their mandrels 26 moves downwardly to penetrate into the upper end portions of registering parisons.

The holders 55, 55a of the mold units 61 are movable toward and away from each other by the cam 53 on the platform 51 of the control sleeve 49. The follower arms 69 are provided with rollers which track the internal and external faces of the cam 53 and reciprocate crossheads 70 which are movable in directions indicated by arrows F and G. The crossheads 70 reciprocate tie rods 71 which, in turn, move the holders 55, 55a in the same way as shown in FIG. 2 for the holders 24, 24a. The tie rods 71 are hollow and accommodate portions of tie rods 72 which can reciprocate cupped supporting members or brackets 73 for the respective blowing and calibrating units 68. The cam 52 on the platform 50 of the control sleeve 49 reciprocates follower arms which transmit motion to crossheads 74 connected with the tie rods 72. The just described mounting of tie rods 72 in hollow tie rods 71 saves space and facilitates more accurate synchronization of movements of blowing units 68 with movements of associated holders 55, 55a.

The table or support 54 of FIG. 4 comprises two spaced horizontal disks or plates 93, 94 connected to a cylindrical hub 92 which surrounds the main shaft 39. The upper disk 93 carries the mold units 61 and blowing units 68. Additional or auxiliary blowing units 95 can be mounted on the table 54 to cooperate with the mold units 61 if each of these mold units includes a mold defining two or more cavities so that it can receive two or more parisons at a time. The mandrels of the blowing units 95 are movable up and down but these units need not be moved radially or otherwise in a horizontal plane with reference to the table 54 because they cannot interfere with movements of the extrusion nozzles 59.

Figure 6:
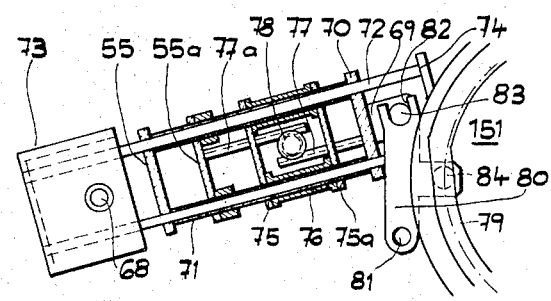
FIG. 6 is a fragmentary horizontal sectional view of a fourth blow molding apparatus which constitutes a modification of the apparatus shown in FIG. 4.
Figure 7:
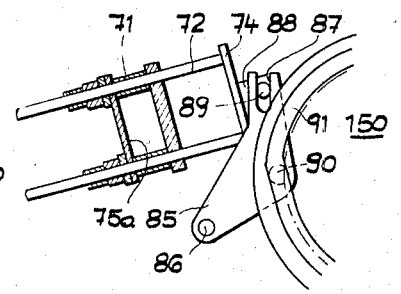
FIG. 7 is another fragmentary horizontal sectional view of the fourth blow molding apparatus.

Referring finally to FIGS. 6 and 7, there is shown a modified control system which can be employed to synchronize the movements of mold units and blowing units with those of one or more travelling extruders. FIG. 6 shows a portion of a platform 151 which is provided with an endless cam groove 79 and FIG. 7 shows a platform 150 having an endless cam groove 91. Brackets 75, 75a are provided in each mold unit (only one shown in FIG. 6) to support bearing sleeves 76 for hollow outer tie rods 71 which transmit motion to the holders 55, 55a. The tie rods 71 accommodate inner tie rods 72 which effect movements of the bracket 73 for the corresponding blowing unit 68. The crosshead 70 is rigid with a toothed rack 77 which meshes with a pinion 78 and the latter also meshes with a second toothed rack 77a affixed to the holder 55a. The holder 55 is affixed to the outer ends of tie rods 71, and the holder 55a is slidable on the tie rods 71. The holder 55a respectively moves in directions indicated by arrows G and F (FIG. 4) when the respective mold is to close or open. The holder 55 moves in opposite directions. A difference between the embodiments of FIG. 4 and FIGS. 6–7 is that the crosshead 70 of FIG. 6 does not receive motion directly from the carrier 151 but rather through a transmission which includes a two-armed motion transmitting lever 80. The latter is fulcrumed on a fixed pin 81 and one of its arms has a recess or notch 82 for a roller or stud 83 on the follower arm 69 which latter is rigid with the crosshead 70. A follower roller or pin 84 on the other arm of the lever 80 extends into the cam groove 79 of the platform 151. The transmission ratio depends on the distances between the axes of parts 81, 83 and 84. An important advantage of the lever 80 is that it can transform relatively small deviations of the cam groove 79 from a circle into much larger displacements of the crosshead 70. Furthermore, lateral or bending stresses acting upon the tie rods 71 are reduced considerably if the follower arm 69 does not engage directly with the platform 151 or with a cam on this platform. Still further, the closing and opening movements of holders 55, 55a are more rapid than in the apparatus of FIG. 2 or 4.

FIG. 7 shows a second motion transmitting lever 85 which is fulcrumed on a fixed pivot pin 86 and has a recess or notch 87 for a pin or roller 89 on a follower arm 88 which is rigid with the crosshead 74 and hence with the tie rods 72. A follower pin or roller 90 of the lever 85 extends into the cam groove 91 of the platform 150. The tie rods 72 transmit motion to the respective bracket 73 for one of the blowing and calibrating units 68.

It is clear that the improved blow molding apparatus is susceptible of many additional modifications without departing from the spirit of my invention. For example, the turntable 1, 36 or 44 can support a single extruder or three or more rigidly and/or adjustably mounted extruders. A single travelling extruder can cooperate with a set of three or four mold units. Furthermore, and as shown in FIGS. 6 and 7, the control cams (such as 19 and 119 of FIG. 2 or 52, 53 of FIG. 4) can be omitted if the platforms are provided with suitable cam grooves or raised portions to transmit motion directly to follower arms or to levers such as those shown in FIGS. 6 and 7. It is also possible to move the nozzle or nozzles of one or more extruders along endless paths of other than circular outline, for example, along elliptical paths.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. Apparatus for the production of hollow plastic articles in accordance with the blow molding process, comprising extruder means including at least one extruder having nozzle means arranged to discharge blanks of plasticized material; drive means for moving said nozzle means along an endless circular path; a support; a plurality of mold units mounted on said support adjacent to said path and arranged to receive blanks from said nozzle means; and reciprocating means for moving said support up and down in synchronism with movements of said nozzle means along said path.

2. Apparatus as defined in claim 1, wherein said support is a horizontal table.

3. Apparatus as defined in claim 1, wherein said reciprocating means comprises at least one fluid-operated cylinder member and a piston member reciprocably received in said cylinder member, one of said members being stationary and the other member being fixed to said support.

4. Apparatus as defined in claim 1, wherein each of said mold units comprises a plurality of movable parts and said drive means comprises a rotary turntable supporting said extruder means, and further comprising a main shaft coaxial with and arranged to rotate in synchronism with said turntable and control means receiving motion from said main shaft and arranged to move said movable parts of said mold units in synchronism with movements of said nozzle means.

5. Apparatus as defined in claim 4, further comprising a blowing unit cooperating with each of said mold units to convert blanks received in said mold units into hollow plastic articles, each of said blowing units comprising movable parts and further comprising additional control means receiving motion from said main shaft and arranged to move the movable parts of said blowing units in synchronism with movements of movable parts of the respective mold units.

6. Apparatus as defined in claim 5, wherein said blowing units are mounted on said support.

7. Apparatus for the production of hollow plastic articles in accordance with the blow molding process, comprising extruder means including at least one extruder having nozzle means arranged to discharge blanks of plasticized material; drive means for moving said nozzle means along an endless path and including a rotary turntable supporting said exruder means; a plurality of mold units adjacent to said path and arranged to receive blanks from said nozzle means, each of said mold units comprising a plurality of movable parts; a main shaft coaxial with and arranged to rotate in synchronism with said turntable; first control means receiving motion from said main shaft and arranged to move said movable parts of said mold units in synchronism with movements of said nozzle means, said first control means comprising a sleeve rotatable with and reciprocable axially of said main shaft and a first control cam rigid with said sleeve; a blowing unit cooperating with each of said mold units to convert blanks received in said mold units into hollow plastic articles, each of said blowing units comprising movable parts; and second control means receiving motion from said main shaft and arranged to move the movable parts of said blowing units in synchronism with movements of movable parts of the respective mold units, said second control means comprising a second control cam rigid with said sleeve.

8. Apparatus as defined in claim 7, wherein said main shaft is rotatable about a vertical axis and said control cams are disposed at different levels.

9. Apparatus for the production of hollow plastic articles in accordance with the blow molding process, comprising extruder means including at least one extruder having nozzle means arranged to discharge blanks of plasticized material; drive means for moving said nozzle means along an endless circular path, said drive means comprising a turntable rotatable about a vertical axis and supporting said extruder means, a motor, and speed reducing means connecting said motor with said turntable to rotate the latter continuously; a plurality of mold units adjacent to said path and arranged to receive blanks from said nozzle means; a stationary support for said mold units; a main shaft coaxial with said turntable; synchronizing means connecting said motor with said main shaft to rotate the latter in synchronism with said turntable; and a control cam arranged to rotate with said main shaft, each of said mold units comprising a mold having sections movable with reference to each other and means including followers cooperating with said cam to move said sections with reference to each other in synchronism with movements of said nozzle means in response to rotation of said main shaft.

10. Apparatus as defined in claim 9, wherein each of said mold units further comprises a crosshead rigid with the respective follower means and with one section of the respective mold, said crossheads being movable by said cam in a horizontal plane.

11. Apparatus for the production of hollow plastic articles in accordance with the blow molding process, comprising extruder means including at least one extruder having a magazine and nozzle means arranged to discharge blanks of plasticized material; drive means for moving said nozzle means along an endless path, said drive means comprising a turntable rotatable about a vertical axis; a plurality of mold units adjacent to said path and arranged to receive blanks from said nozzle means; and a carriage provided on said turntable and supporting said extruder for lengthwise movement with reference thereto, said carriage being pivotable with reference to said turntable about a second vertical axis and comprising a hollow pivot whose pivot axis coincides with said second vertical axis and which is arranged to feed starting material to said magazine.

12. Apparatus for the production of hollow plastic articles in accordance with the blow molding process, comprising extruder means including at least one extruder having nozzle means arranged to discharge blanks of plasticized material; drive means for moving said nozzle means along an endless path; a plurality of mold units adjacent to said path and arranged to receive blanks from said nozzle means, each of said mold units comprising a pair of holders movable with reference to each other, a mold section carried by each of said holders, and hollow tie rods connected with said holders to transmit motion thereto; and a blowing unit associated with each of said mold units, each of said blowing units including a bracket and second tie rods received in the hollow tie rods of the respective mold unit and arranged to transmit motion to said bracket.

13. Apparatus as defined in claim 12, further comprising control means for moving said brackets and said holders in synchronism with movements of said nozzle means, said control means comprising a pair of rotary control cams, a set of motion transmitting members tracking each of said cams, first follower means connecting the tie rods of each mold unit with one motion transmitting member of one of said sets, and second follower means connecting the tie rods of each blowing unit with one motion transmitting member of the other set.

14. Apparatus as defined in claim 13, wherein said control cams are rotatable about a common vertical axis and said path is a circular path having its center on said vertical axis.

15. Apparatus as defined in claim 14, wherein each of said cams has an endless cam groove and each of said motion transmitting members comprises a follower portion extending into the respective groove.

16. Apparatus for the production of hollow plastic articles in accordance with the blow molding process, comprising extruder means including at least one extruder having nozzle means arranged to discharge blanks of plasticized material; drive means for moving said nozzle means along an endless path and including a rotary turntable supporting said extruder means; a plurality of mold units adjacent to said path and arranged to receive blanks from said nozzle means, each of said mold units comprising a plurality of movable parts; a main shaft coaxial with and arranged to rotate in synchronism with said turntable; and control means receiving motion from said main shaft and arranged to move said movable parts of said mold units in synchronism with movements of said nozzle means, said control means comprising a sleeve rotatable with and movable axially of said main shaft and cam means rigid with said sleeve.

References Cited

UNITED STATES PATENTS

| | | | |
|---|---|---|---|
| 3,078,517 | 2/1963 | Makowski | 18—20 |
| 3,205,536 | 9/1965 | Funck | 18—30 |
| 3,293,691 | 12/1966 | Osgood | 18—20 |
| 3,335,464 | 8/1967 | Schwartz | 18—30 |
| 3,355,763 | 12/1967 | Willert | 18—5 |
| 3,357,046 | 12/1967 | Pechthold. | |

FOREIGN PATENTS 1,501,027   9/1966   France.

J. SPENCER OVERHOLSER, Primary Examiner

M. O. SUTTON, Assistant Examiner

U.S. Cl. X.R.

18—20